US012812020B1

(12) United States Patent
Glozman et al.

(10) Patent No.: US 12,812,020 B1
(45) **Date of Patent: *Nov. 24, 2026**

(54) SYSTEM, METHOD, AND COMPUTER PROGRAM FOR INTENT TO SERVICE MAPPING IN INTENT-BASED ORCHESTRATION

(71) Applicant: Amdocs Development Limited, Limassol (CY)

(72) Inventors: Borislav Glozman, Ramat Gan (IL); Avi Chapnick, Ramat Gan (IL); Roy Segal, Mishmar-David (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 69 days.

This patent is subject to a terminal disclaimer.

(21) Appl. No.: 18/938,152

(22) Filed: Nov. 5, 2024

Related U.S. Application Data

(63) Continuation of application No. 18/239,657, filed on Aug. 29, 2023, now Pat. No. 12,177,316.

(51) Int. Cl.
*H04L 67/61* (2022.01)
*H04L 67/568* (2022.01)

(52) U.S. Cl.
CPC ............ *H04L 67/61* (2022.05); *H04L 67/568* (2022.05)

(58) Field of Classification Search
CPC .............................. H04L 67/61; H04L 67/568
See application file for complete search history.

(56) References Cited

U.S. PATENT DOCUMENTS

| | | | | |
|---|---|---|---|---|
| 11,095,714 | B2 * | 8/2021 | Baddepudi | H04L 67/62 |
| 2016/0218933 | A1 * | 7/2016 | Porras | H04L 41/147 |
| 2018/0152884 | A1 * | 5/2018 | Hu | H04W 8/18 |
| 2019/0379613 | A1 * | 12/2019 | Bernat | H04L 47/805 |
| 2020/0084120 | A1 * | 3/2020 | A | G06F 9/5027 |
| 2022/0022015 | A1 * | 1/2022 | Xu | H04W 4/50 |
| 2022/0278905 | A1 * | 9/2022 | Li | H04L 41/28 |

* cited by examiner

*Primary Examiner* — Clayton R Williams
(74) *Attorney, Agent, or Firm* — Zilka-Kotab, P.C.

(57) ABSTRACT

As described herein, a system, method, and computer program are provided for intent to service mappings in intent-based orchestration. An intent orchestrator receives an intent specifying one or more parameters of a service required for a network. The intent orchestrator translates the intent to one or more basic data types of a plurality of predefined basic data types based on the one or more parameters. The intent orchestrator forms one or more abstract services using the one or more basic data types. The intent orchestrator determines one or more specific services of a network orchestrator that correlate with the one or more abstract services. The intent orchestrator causes the network orchestrator to fulfill the intent using the one or more specific services.

16 Claims, 5 Drawing Sheets

SYSTEM, METHOD, AND COMPUTER PROGRAM FOR INTENT TO SERVICE MAPPING IN INTENT-BASED ORCHESTRATION

RELATED APPLICATIONS

The present application is a continuation of U.S. application Ser. No. 18/239,657, filed Aug. 29, 2023 and entitled "SYSTEM, METHOD, AND COMPUTER PROGRAM FOR INTENT TO SERVICE MAPPING IN INTENT-BASED ORCHESTRATION," the entire contents of which is incorporated herein by reference.

FIELD OF THE INVENTION

The present invention relates to intent-based network management and orchestration.

BACKGROUND

Intent-based orchestration, including network management and network orchestration, is one of the prominent tools in automation of modern networks and services. It refers to a form of network administration that incorporates modern computer technologies, such as machine learning, to automate administrative tasks across a network. Intent-based orchestration reduces the complexity of creating, managing and enforcing network policies and also reduces the manual labor associated with traditional configuration management.

In general, in intent-based orchestration, an intent-based command is issued by a user, usually from a non-technical business perspective. The command may be provided in a natural language and describes a request for a service, rather than how to implement the request. The particular intent of the user is derived from the command, and the intent is then translated to actions that are performed to achieve the user's intent.

However, the actual services are provided by orchestration systems that are separate from the tool used to receive intents from users. This creates a decoupling of services from intents, where the services may be introduced rapidly for different use-cases, and implemented by predefined orchestration systems. As a result, a mapping between intents and the services of a given orchestration system is required.

There is thus a need for addressing these and/or other issues associated with the prior art. For example, there is a need to provide intent to service mappings in intent-based orchestration.

SUMMARY

As described herein, a system, method, and computer program are provided for intent to service mappings in intent-based orchestration. An intent orchestrator receives an intent specifying one or more parameters of a service required for a network. The intent orchestrator translates the intent to one or more basic data types of a plurality of predefined basic data types based on the one or more parameters. The intent orchestrator forms one or more abstract services using the one or more basic data types. The intent orchestrator determines one or more specific services of a network orchestrator that correlate with the one or more abstract services. The intent orchestrator causes the network orchestrator to fulfill the intent using the one or more specific services.

DETAILED DESCRIPTION

Figure 1:
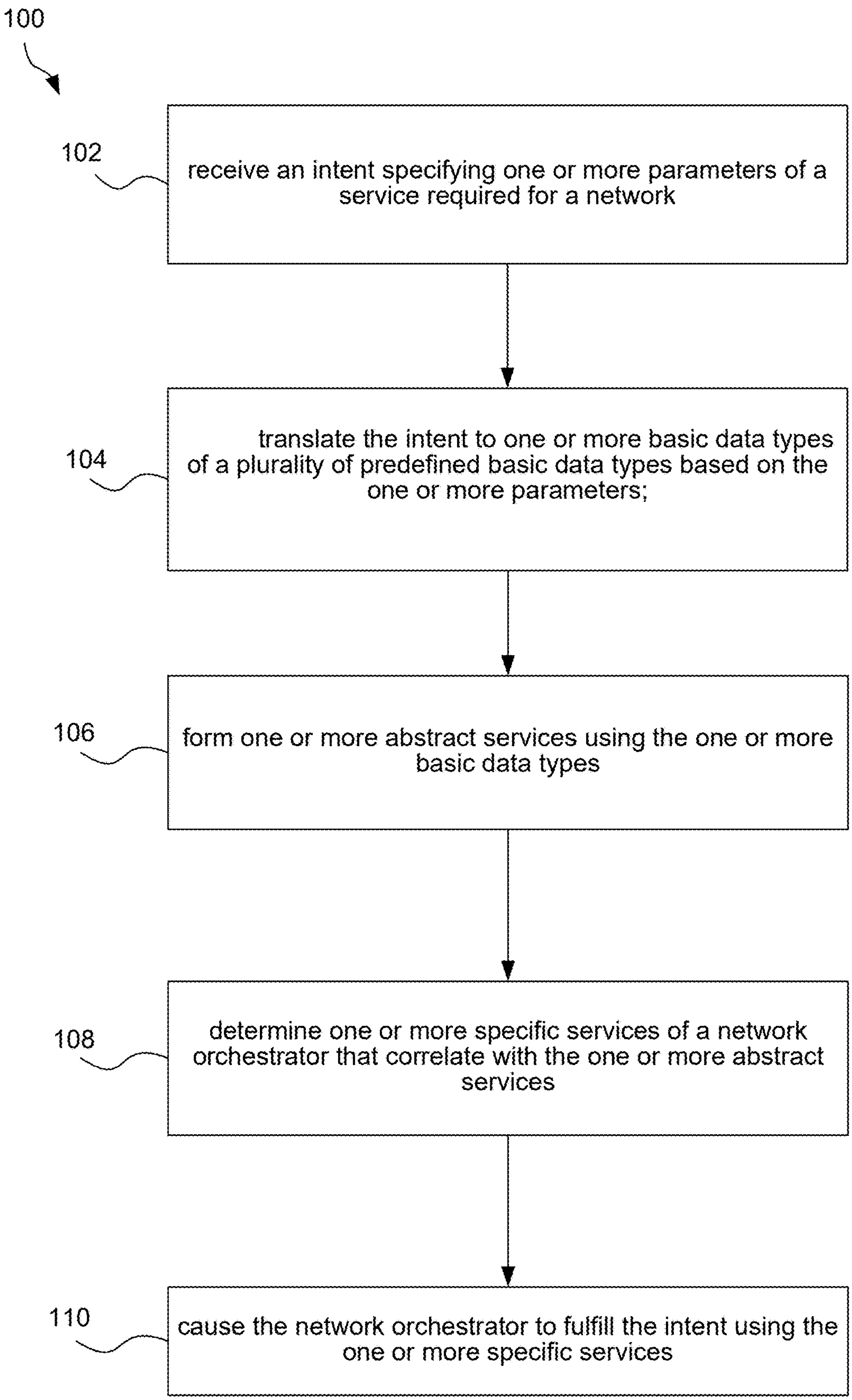
FIG. 1 illustrates a method for intent to service mappings in intent-based orchestration, in accordance with one embodiment.

FIG. 1 illustrates a method 100 for intent to service mappings in intent-based orchestration, in accordance with one embodiment. The method 100 may be carried out by a computer system, such as that described below with respect to FIGS. 4 and/or 5. For example, the method 100 may be performed by a computer system providing intent-based orchestration.

With respect to the present description, the intent-based orchestration refers to a method and system of network management and orchestration in which network tasks are automatically performed based on the intent derived from user input (natural language) commands. In an embodiment of intent-based orchestration, a command input by a user is processed to determine an intent of the user. The intent can then be processed to determine actions to take to achieve the user's intent.

In the context of the present embodiment, the method 100 is performed by an intent orchestrator. The intent orchestrator interfaces an intents system that generates intents for intent-based orchestration as well as a network orchestrator that performs actions to achieve the intent in the network. The intent orchestrator enables communications between the intents system and the network orchestrator. The intent orchestrator refers to computer logic and/or a computer process that executes to perform the method 100 as described herein.

In operation 102, an intent specifying one or more parameters of a service required for a network is received. In an embodiment, the intent may be a formal description of a request associated with a service. The request may be to create a new service in a network, terminate an existing service in the network, modify an existing service in the network, etc. The service may refer to a business service or a network service.

In an embodiment, the intent may be generated based on a natural language input provided by a user. The natural language input may be a command associated with the service. In an embodiment, the natural language input may be processed to generate the intent, or in other words the intent may be derived from the natural language input.

As mentioned, the intent specifies one or more parameters of the service required for a network. In an embodiment, the parameter(s) may include properties of the service required for the network. In another embodiment, the parameter(s) may include requirements of the service required for the network.

In operation 104, the intent is translated to one or more basic data types of a plurality of predefined basic data types based on the one or more parameters. In an embodiment, each basic data type of the plurality of predefined basic data types may represent a different combination of intent parameters.

In an embodiment, the intent may be translated by determining which of the predefined basic data types represent the parameters specified by the intent. In an embodiment, the intent may be translated to the one or more basic data types based on a preconfigured declarative mapping between the one or more parameters specified in the intent and the one or more basic data types. Of course, however, the intent may be translated to the one or more basic data types using any matching or mapping technique that uses the one or more parameters specified in the intent to translate (e.g. correlates, maps, etc.) the intent to one or more of the predefined basic data types.

In operation 106, one or more abstract services are formed using the one or more basic data types. An abstract service refers to a service that is defined abstractly using one or more of the predefined basic data types. In an embodiment, each of the one or more abstract services may be formed by aggregating at least a portion of the one or more basic data types into the abstract service.

For example, all of the basic data types (translated as disclosed above) may be aggregated to form a single abstract service. As another example, a first subset (one or more) of the basic data types may be aggregated to form a first abstract service, a second (different) subset of the basic data types may be aggregated to form a second abstract service, and so on. The number of different abstract services formed may be based on various preconfigured policies defining how to group the predefined basic data types into abstract services. In any case, the one or more abstract services represent a general (e.g. generic, basic, non-specific, etc.) representation of the intent.

In operation 108, one or more specific services of a network orchestrator that correlate with the one or more abstract services are determined. The specific services refer to existing services of network orchestrator that are capable of being implemented in a network. The specific services may be defined in accordance with a standard used by the network orchestrator. In an embodiment, the one or more specific services of the network orchestrator that correlate with the one or more abstract services may include those services of the network orchestrator that satisfy requirements of the one or more abstract services.

In an embodiment, the one or more specific services of the network orchestrator that correlate with the one or more abstract services may be determined by translating the basic data types included in each of the one or more abstract services to specific data types included in each specific service of the network orchestrator. For example, the basic data types included in each of the one or more abstract services may be translated to the specific data types included in each specific service of the network orchestrator by using a translation logic.

The translation logic may be configured such that only specific services having specific data types matching all basic data types included in each of the one or more abstract services are candidates for correlation with the one or more abstract services. In an embodiment, the translation logic may be further configured such that values of the basic data types and values of the specific data types included in the candidate specific services are compared to determine the one or more specific services of the network orchestrator that correlate with the one or more abstract services. In an embodiment, the translation logic may be further configured such that when one of the one or more abstract services is matched to multiple specific services of the network orchestrator, then an optimization algorithm is used to choose one of the multiple specific services for correlation with the one of the one or more abstract services.

In operation 110, the network orchestrator is caused to fulfill the intent using the one or more specific services. In an embodiment, causing the network orchestrator to fulfill the intent using the one or more specific services may include the intent orchestrator communicating information to the network orchestrator that causes the network orchestrator to fulfill the intent using the one or more specific services. The information may be an instruction to deploy the one or more specific services in the network, for example.

In an embodiment, the network orchestrator may fulfill the intent using the one or more specific services by creating instances of the one or more specific services in the network. In an embodiment, a mapping between the intent and the one or more specific services of the network orchestrator may also be stored (e.g. by the intent orchestrator). The mapping may then be retrieved when an additional instance of the same intent is subsequently received (i.e. repeating operation 102), for use in determining the one or more specific services that correlate with such intent. In this way, operations 104-108 may be avoided when the additional instance of the same intent is received, by simply using the already stored mapping to determine the one or more specific services that correlate with the intent.

In an embodiment, a re-mapping of the intent to specific services of the network orchestrator may be performed when the one or more specific services of the network orchestrator have changed. In particular, when any specific services mapped to the intent are changed, then the re-mapping may be performed. The re-mapping may refer to repeating operations 104-108 for the intent. This may be performed when an additional instance of the same intent is subsequently received or when the intent orchestrator is notified (e.g. by the network orchestrator), or otherwise detects, that any of specific services to which the intent is mapped have changed.

To this end, the method 100 may be performed to provide intent to service mappings in intent-based orchestration. This method 100 may be used, for example, in a situation where the intent orchestrator that receives intents is separate from the network orchestrator that provides the services in the network, to allow the intents to be translated to the specific services available from the network orchestrator at the time the intent is received.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
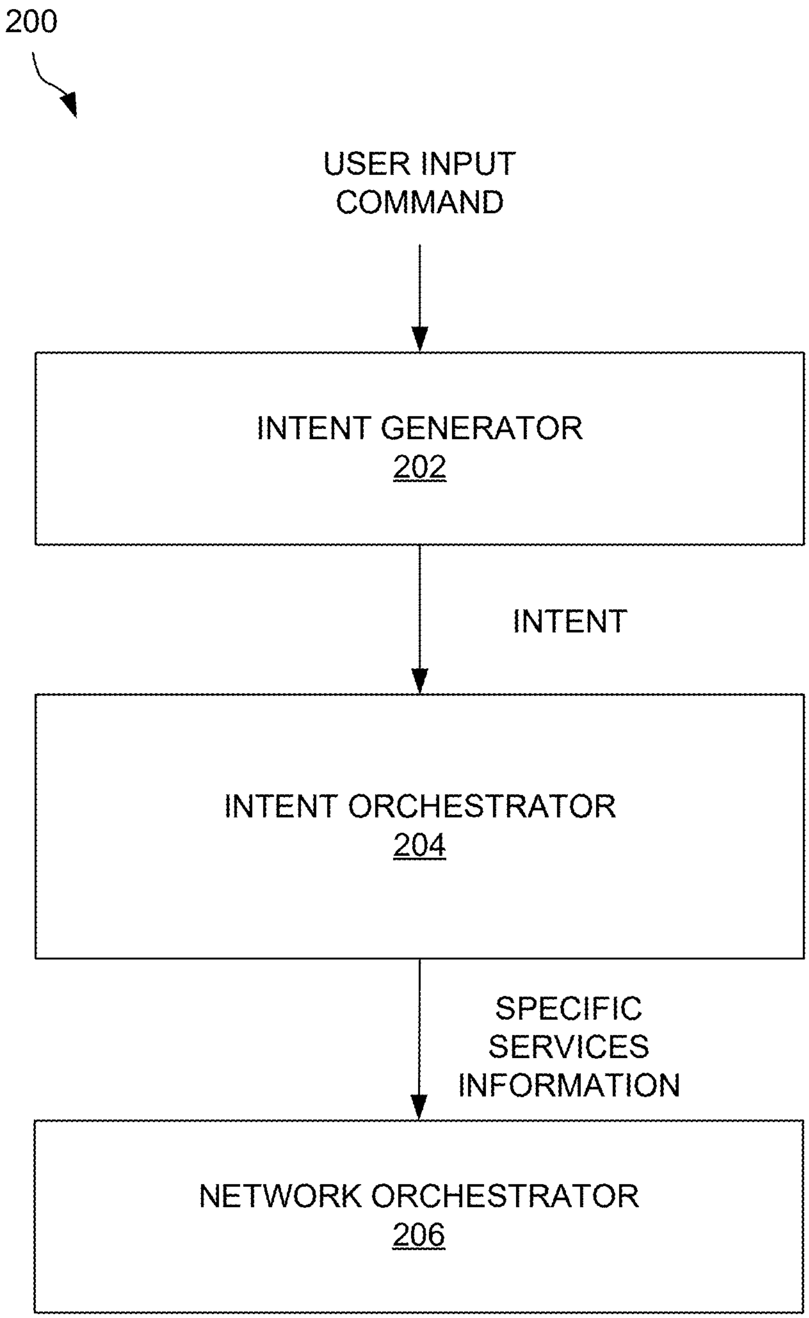
FIG. 2 illustrates a system for intent to service mappings in intent-based orchestration, in accordance with one embodiment.

FIG. 2 illustrates a system 200 for intent to service mappings in intent-based orchestration, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes an intent generator 202 that receive an input command from a user and outputs an intent derived from the input command. In general, the intent may refer to a formal description of a required service (e.g. business, network, etc.) describing what is requested, rather than how to implement the request. The intent may specify one or more parameters of the service required for a network. The parameter(s) may include properties and/or requirements of the service.

The system 200 also includes an intent orchestrator 204 that receives the intent from the intent generator 202 and maps the intent to one or more specific services of a network orchestrator 206. The intent orchestrator 204 may operate in accordance with the method 100 of FIG. 1. For example, the intent orchestrator 204 may translate the intent to one or more basic data types of a plurality of predefined basic data types based on the one or more parameters, then may form one or more abstract services using the one or more basic data types, and then may determine one or more specific services of the network orchestrator 206 that correlate with the one or more abstract services.

As shown, the intent orchestrator 204 outputs to the network orchestrator 206 information regarding the one or more specific services determined by the intent orchestrator 204. This output may cause the network orchestrator 206 to fulfill the intent using the one or more specific services.

Figure 3:
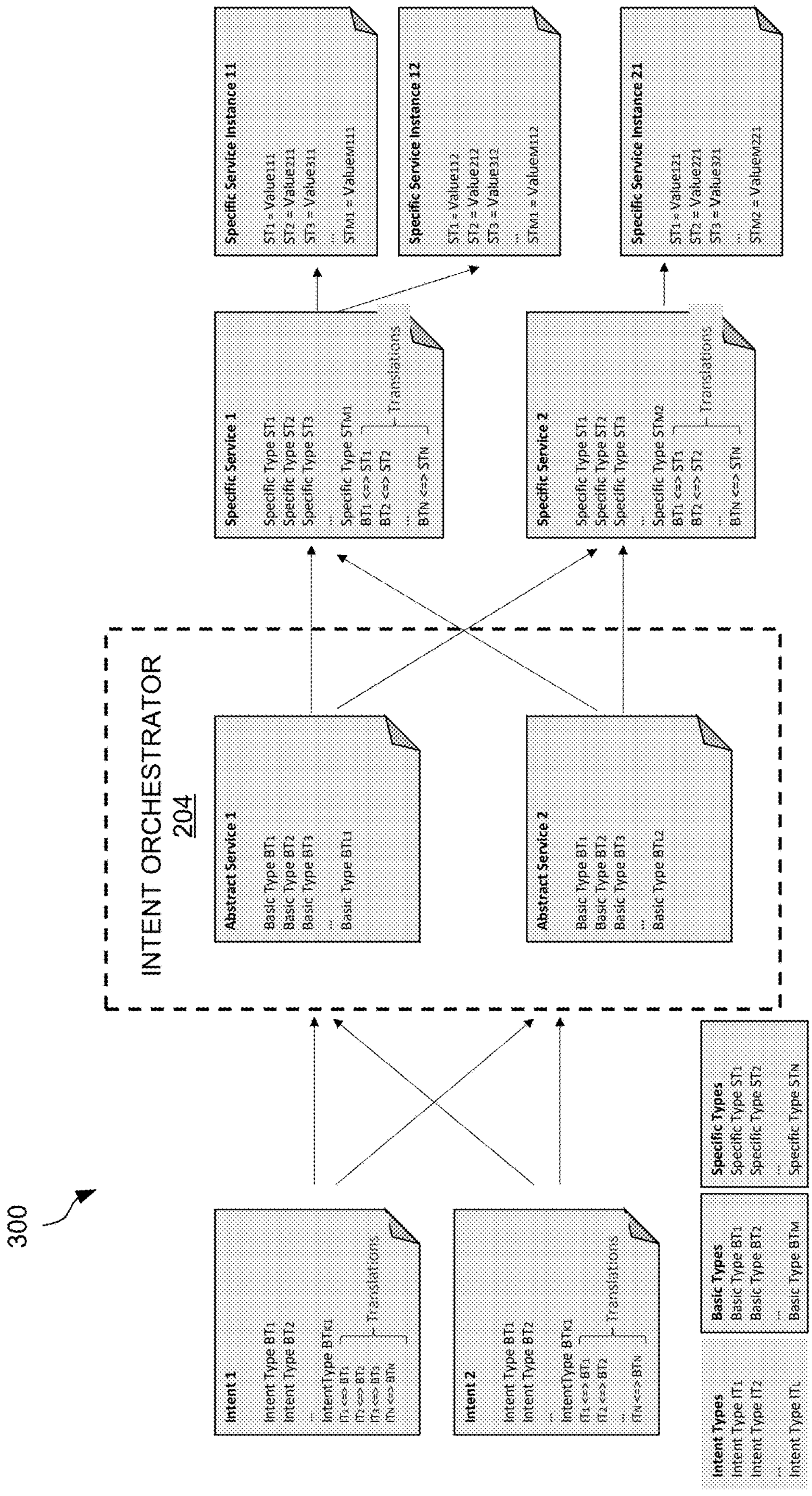
FIG. 3 illustrates a flow diagram of the intent orchestrator of FIG. 2, in accordance with one embodiment.

FIG. 3 illustrates a flow diagram of the intent orchestrator 204 of FIG. 2, in accordance with one embodiment.

In the present embodiment, the intent orchestrator 204 may be implemented in the context of multiple standards organizations defining intent differently, such as:

1. TeleManagement™ Forum define intent using ontology defined in TMF 291, using Resource Description Framework Schema/Web Ontology Language (RDFS/OWL) modeling and REST application programming interfaces (APIs).
2. 3rd Generation Partnership Project (3GPP) defines intent (TS 28.312) using network resource model (NRM), Information Object Classes (IOCs) and Data-Types.
3. European Telecommunications Standards Institute Zero-touch network and Service Management (ETSI ZSM) has in "ETSI GR ZSM 005" its defined format to describe intents (Dynamic Service Descriptors). It further explores Intents in "ETSI GR ZSM 011".

In this context, the intent orchestrator 204 defines basic data types in order to represent different intent properties and capabilities. The intent orchestrator 204 further defines declarative mappings between intent types and basic data types and stores these mappings as an intent mapping knowledge base.

An intent request arriving to the intent orchestrator 204 is translated from its requirements and properties to basic data types, using the intent mapping knowledge base, which are then aggregated in an abstract service that acts as a general intent representation in the intent orchestrator 204. The abstract service is then used to find a specific service of the network orchestrator 206 that satisfies the requirements of the abstract service.

In order to find a specific service, basic data types in the abstract service are translated to specific data types in each specific service using mapping logic. Only the specific services having specific data types that can be matched to all of the basic data types are considered as a feasible solution. Then the values between such basic and specific data types are compared in order to find the specific service that satisfies the intent. If there are multiple matches, an optimization algorithm is used to choose the most appropriate one.

After successful mapping between the intent and the specific service is established, this mapping is retained until requirements of the intent change or the specific service (e.g. quality of service) no longer satisfies the intent requirements. Upon such occasion, re-mapping may take place.

The intent orchestrator 204 can then communicate with the network orchestrator 206 to cause the network orchestrator 206 to then deploy an instance of the specific service in the network in order to fulfill the original intent received by the intent orchestrator 204.

Figure 4:
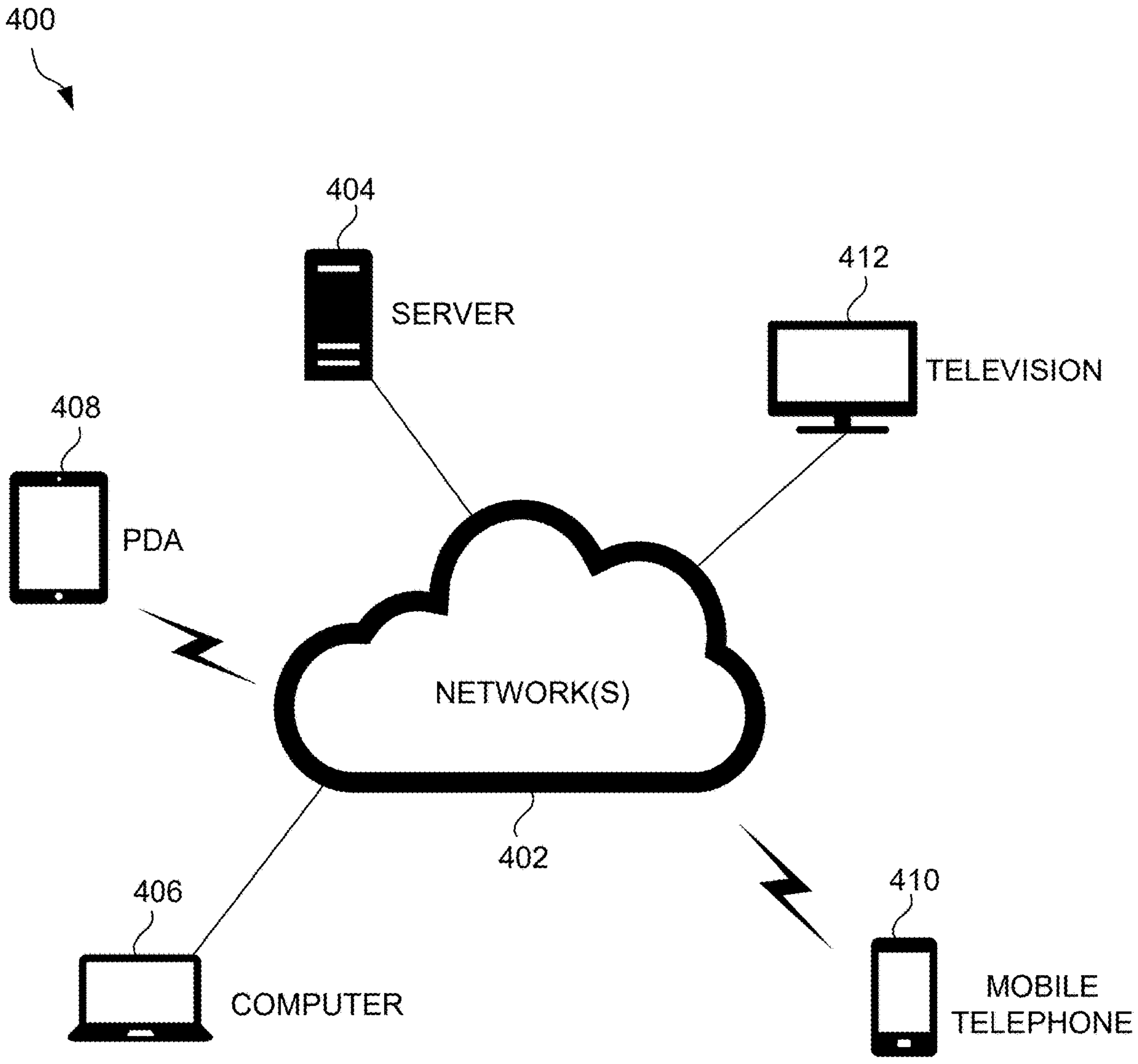
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
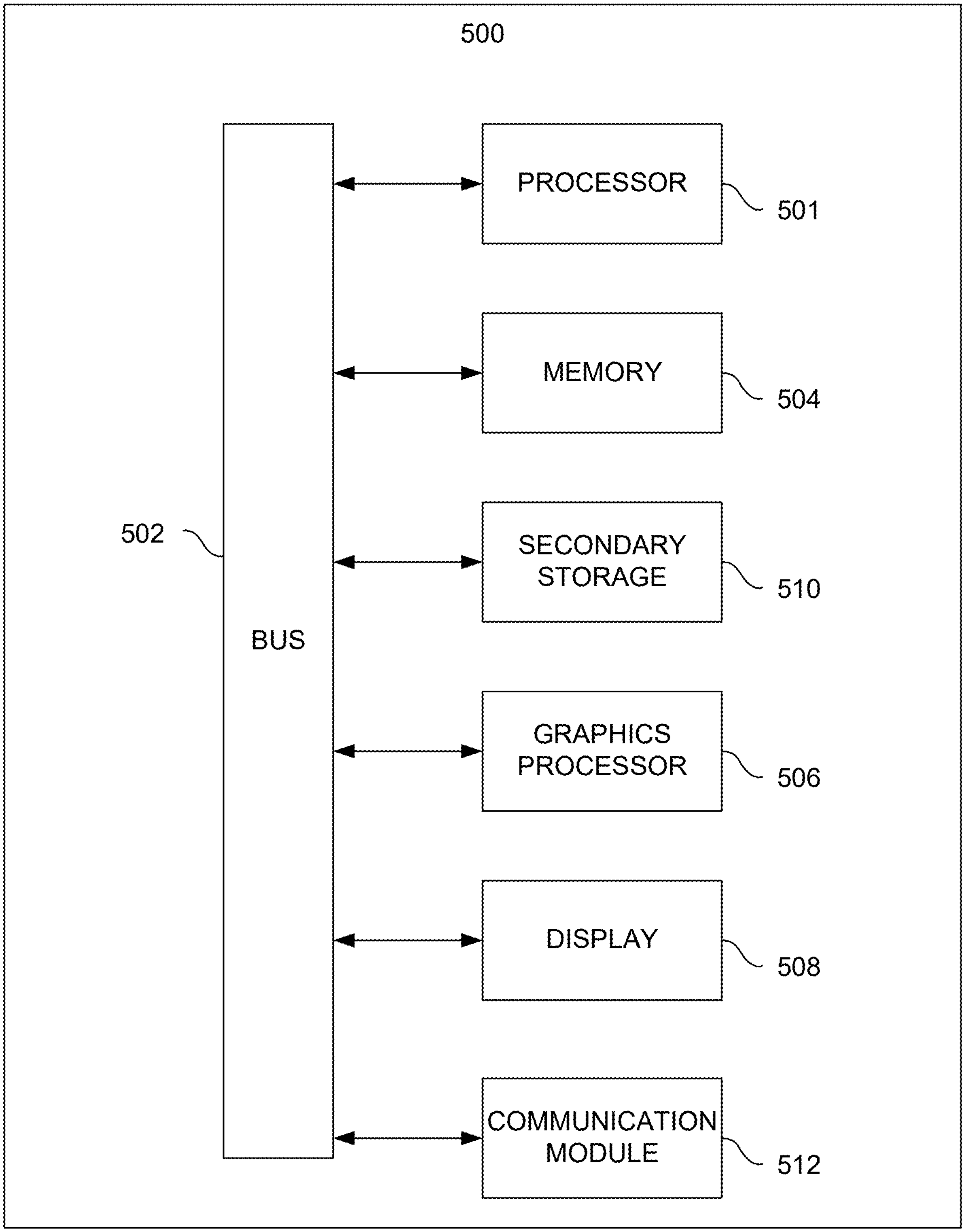
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

receive, by an intent orchestrator, an intent specifying one or more parameters of a service required for a network;

translate, by the intent orchestrator, the intent to one or more basic data types of a plurality of predefined basic data types based on the one or more parameters, wherein each basic data type of the plurality of predefined basic data types represents a different combination of intent parameters, and wherein each basic data type of the one or more basic data types represents a different combination of the one or more parameters specified in the intent;

form, by the intent orchestrator, one or more abstract services using the one or more basic data types;

determine, by the intent orchestrator, one or more specific services of a network orchestrator that correlate with the one or more abstract services by:

translating the basic data types included in each of the one or more abstract services to specific data types included in specific services of the network orchestrator by using a translation logic, wherein the one or more specific services of the network orchestrator are determined based on a correlation between their specific data types and the basic data types in each of the one or more abstract services; and cause, by the intent orchestrator, the network orchestrator to fulfill the intent using the one or more specific services.

2. The non-transitory computer-readable media of claim 1, wherein the service required for the network is one of a business service or a network service.

3. The non-transitory computer-readable media of claim 1, wherein the one or more parameters specified in the intent include at least one of properties or requirements of the service required for the network.

4. The non-transitory computer-readable media of claim 1, wherein the intent is generated based on a natural language input provided by a user.

5. The non-transitory computer-readable media of claim 1, wherein the intent is translated to the one or more basic data types based on a preconfigured declarative mapping between the one or more parameters specified in the intent and the one or more basic data types.

6. The non-transitory computer-readable media of claim 1, wherein each of the one or more abstract services is formed by aggregating at least a portion of the one or more basic data types into the abstract service.

7. The non-transitory computer-readable media of claim 1, wherein the one or more specific services of the network orchestrator that correlate with the one or more abstract services include those services of the network orchestrator that satisfy requirements of the one or more abstract services.

8. The non-transitory computer-readable media of claim 1, wherein the translation logic is configured such that, for each of the one or more abstract services, specific services having specific data types matching all basic data types included in the abstract service are candidates for correlation with the abstract service.

9. The non-transitory computer-readable media of claim 1, wherein the translation logic is configured such that values of the basic data types and values of the specific data types are compared to determine the one or more specific services of the network orchestrator that correlate with the one or more abstract services.

10. The non-transitory computer-readable media of claim 1, wherein the translation logic is configured such that when any one of the one or more abstract services is matched to multiple specific services of the network orchestrator, then an optimization algorithm is used to choose one of the multiple specific services for correlation with the abstract service.

11. The non-transitory computer-readable media of claim 1, wherein the device is further caused to:

store a mapping between the intent and the one or more specific services of the network orchestrator.

12. The non-transitory computer-readable media of claim 11, wherein the device is further caused to:

perform a re-mapping of the intent to specific services of the network orchestrator when the one or more specific services of the network orchestrator have changed.

13. The non-transitory computer-readable media of claim 1, wherein causing the network orchestrator to fulfill the intent using the one or more specific services includes the intent orchestrator communicating information to the network orchestrator that causes the network orchestrator to fulfill the intent using the one or more specific services.

14. The non-transitory computer-readable media of claim 13, wherein the network orchestrator fulfills the intent using the one or more specific services by creating instances of the one or more specific services in the network.

15. A method, comprising:

at a computer system:

receiving, by an intent orchestrator, an intent specifying one or more parameters of a service required for a network;

translating, by the intent orchestrator, the intent to one or more basic data types of a plurality of predefined basic data types based on the one or more parameters, wherein each basic data type of the plurality of predefined basic data types represents a different combination of intent parameters, and wherein each basic data type of the one or more basic data types represents a different combination of the one or more parameters specified in the intent;

forming, by the intent orchestrator, one or more abstract services using the one or more basic data types;

determining, by the intent orchestrator, one or more specific services of a network orchestrator that correlate with the one or more abstract services by:

translating the basic data types included in each of the one or more abstract services to specific data types included in specific services of the network orchestrator by using a translation logic, wherein the one or more specific services of the network orchestrator are determined based on a correlation between their specific data types and the basic data types in each of the one or more abstract services; and causing, by the intent orchestrator, the network orchestrator to fulfill the intent using the one or more specific services.

16. A system, comprising:

a non-transitory memory storing instructions; and one or more processors in communication with the non-transitory memory that execute the instructions to:

receive, by an intent orchestrator, an intent specifying one or more parameters of a service required for a network;

translate, by the intent orchestrator, the intent to one or more basic data types of a plurality of predefined basic data types based on the one or more parameters, wherein each basic data type of the plurality of predefined basic data types represents a different combination of intent parameters, and wherein each basic data type of the one or more basic data types represents a different combination of the one or more parameters specified in the intent;

form, by the intent orchestrator, one or more abstract services using the one or more basic data types;

determine, by the intent orchestrator, one or more specific services of a network orchestrator that correlate with the one or more abstract services by:

translating the basic data types included in each of the one or more abstract services to specific data types included in specific services of the network orchestrator by using a translation logic, wherein the one or more specific services of the network orchestrator are determined based on a correlation between their specific data types and the basic data types in each of the one or more abstract services; and cause, by the intent orchestrator, the network orchestrator to fulfill the intent using the one or more specific services.

* * * * *